US006722266B1

United States Patent
Yang

(10) Patent No.: US 6,722,266 B1
(45) Date of Patent: Apr. 20, 2004

(54) MULTIPURPOSE OUTDOOR TABLE

(76) Inventor: Jim Chi Hsiang Yang, 17900 Gard Ave., Artesia, CA (US) 90701

( * ) Notice: Subject to any disclaimer, the term of this patent is extended or adjusted under 35 U.S.C. 154(b) by 0 days.

(21) Appl. No.: 10/437,027

(22) Filed: May 14, 2003

(51) Int. Cl.$^7$ .................... A47J 37/00; A47J 37/04; A47J 37/07; F24C 3/00; F24C 3/04
(52) U.S. Cl. ................ 99/340; 99/450; 99/482; 126/9 R; 126/25 R
(58) Field of Search .............. 99/339, 340, 400, 99/401, 444–450, 481, 482; 126/25 R, 9 R, 41 R, 245, 38, 42, 29, 30, 39 H, 39 K

(56) References Cited

U.S. PATENT DOCUMENTS

| | | | | |
|---|---|---|---|---|
| 4,362,093 A | * | 12/1982 | Griscom | 99/339 |
| 4,512,249 A | * | 4/1985 | Mentzel | 99/352 |
| 4,539,901 A | * | 9/1985 | Chen | 99/393 |
| 4,554,864 A | * | 11/1985 | Smith et al. | 99/340 |
| 4,759,276 A | * | 7/1988 | Segroves | 99/339 |
| 4,762,059 A | * | 8/1988 | McLane, Sr. | 99/445 |
| 5,163,359 A | * | 11/1992 | McLane, Sr. | 99/447 |
| 5,195,423 A | * | 3/1993 | Beller | 99/340 |
| 5,517,902 A | * | 5/1996 | Boston | 99/340 |
| 5,531,154 A | * | 7/1996 | Perez, III | 99/340 |
| 6,237,472 B1 | * | 5/2001 | Gates | 99/446 |
| 6,257,130 B1 | * | 7/2001 | Schlosser | 99/482 |
| 6,561,178 B1 | * | 5/2003 | Hayes | 126/25 R |

* cited by examiner

Primary Examiner—Timothy F. Simone
(74) Attorney, Agent, or Firm—Rosenberg, Klein & Lee

(57) ABSTRACT

A multipurpose outdoor table is disclosed to include a polygonal table top formed of a polygonal base plate with a polygonal center opening and face slats arranged on the polygonal base plate around the polygonal center opening, and a barbecue grill unit selectively mounted in the polygonal center opening of the tabletop between a first position where the face slats of the barbecue grill unit are disposed in flush with the face slats of the tabletop, and a second position where the barbecue grill of the barbecue grill unit stands at the top side for roasting meat, the barbecue grill unit having a heat-insulating center sleeve adapted to support a parasol.

5 Claims, 7 Drawing Sheets

MULTIPURPOSE OUTDOOR TABLE

BACKGROUND OF THE INVENTION

1. Field of the Invention

The present invention relates to outdoor tables and, more particularly, to a multipurpose outdoor table, which is equipped with a hidden barbecue grill.

2. Description of the Related Art

FIG. 7 shows an outdoor table according to the prior art. The outdoor table 5 may be made of plastics or metal, having a top center hole 51 for the mounting of the shank 61 of a parasol 6. When putting a barbecue grill 52 on the table 5 for roasting meat, fish, or the like, the barbecue grill 52 must be kept away from the shank 61 of the parasol 6, preventing damage to the shank 61 of the parasol 6. After each use of the barbecue grill 52, the user shall find a space to store the barbecue grill 52.

SUMMARY OF THE INVENTION

The present invention has been accomplished under the circumstances in view. According to one aspect of the present invention, the multipurpose outdoor table comprises a polygonal table top formed of a polygonal base plate with a polygonal center opening and face slats arranged on the polygonal base plate around the polygonal center opening, and a barbecue grill unit selectively mounted in the polygonal center opening of the tabletop between a first position where the face slats of the barbecue grill unit are disposed in flush with the face slats of the tabletop, and a second position where the barbecue grill of the barbecue grill unit stands at the top side for roasting meat. According to another aspect of the present invention, the face slats are replaceable so that the user can change the color pattern of the table when desired. According to still another aspect of the present invention, the barbecue grill unit has a heat-insulating center sleeve adapted to support a parasol.

DETAILED DESCRIPTION OF THE PREFERRED EMBODIMENT

Figure 1:
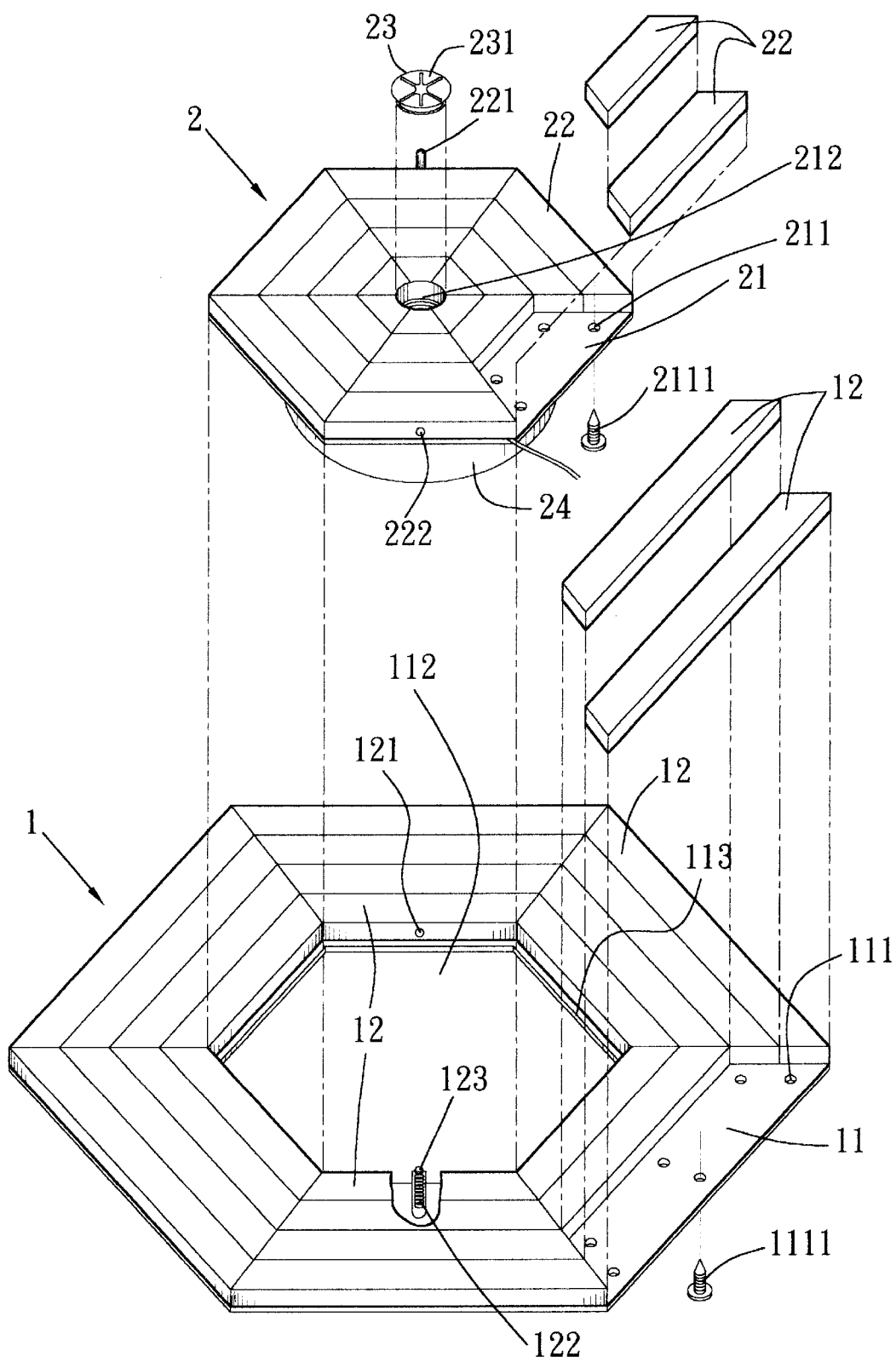
FIG. 1 is an exploded view of the tabletop and the barbecue grill unit of a multipurpose outdoor table according to the present invention.
Figure 2:
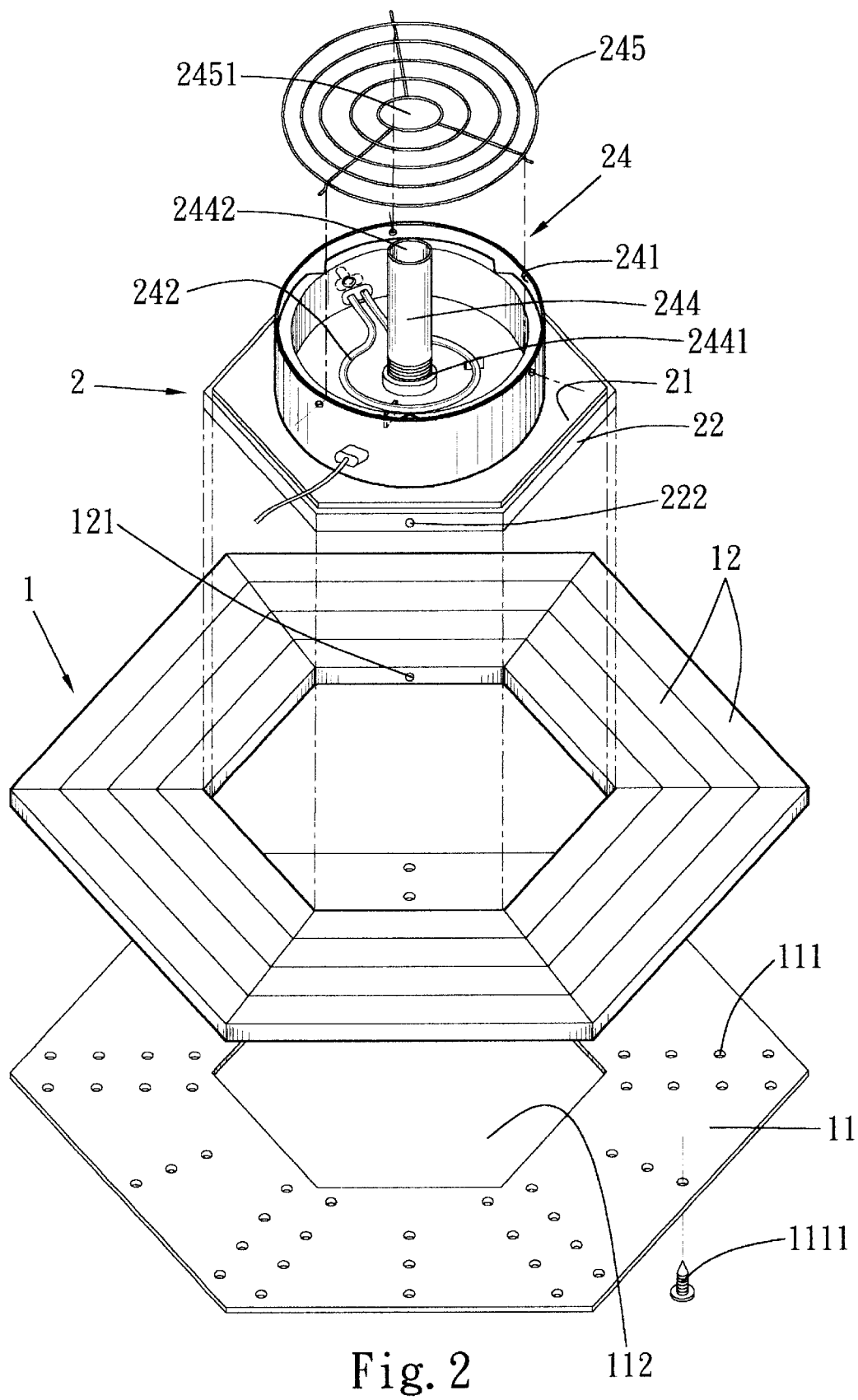
FIG. 2 is another exploded view of the tabletop and the barbecue grill unit according to the present invention.
Figure 3:
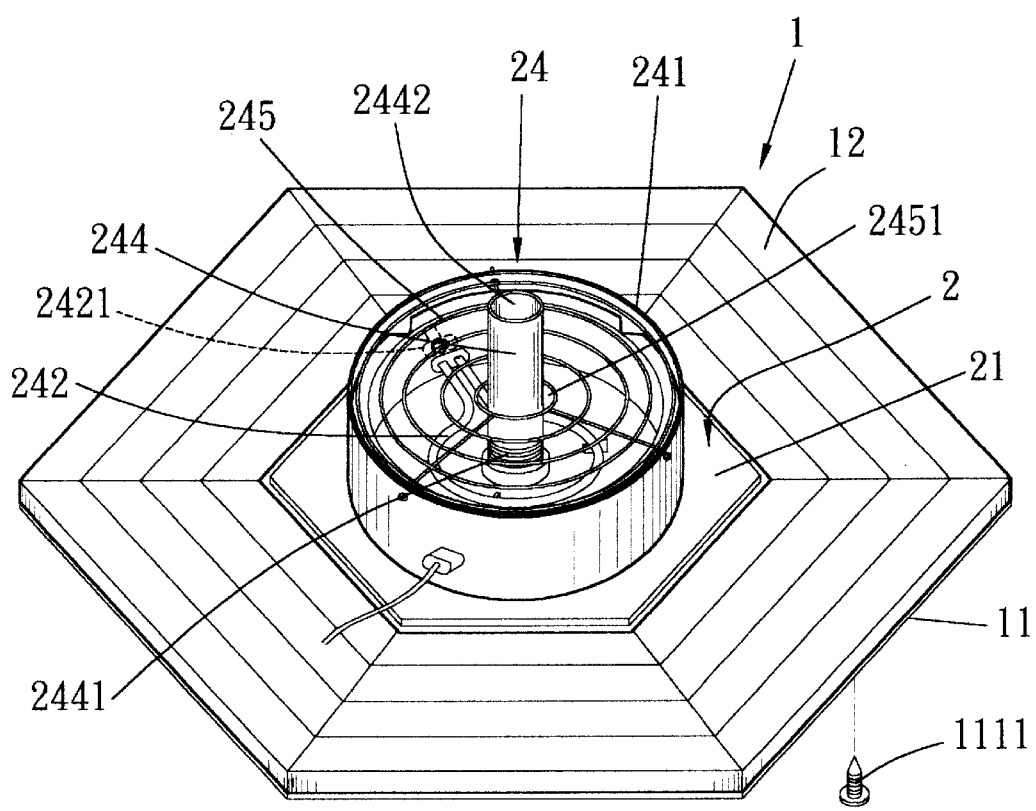
FIG. 3 is an assembly view of FIG. 2.
Figure 4:
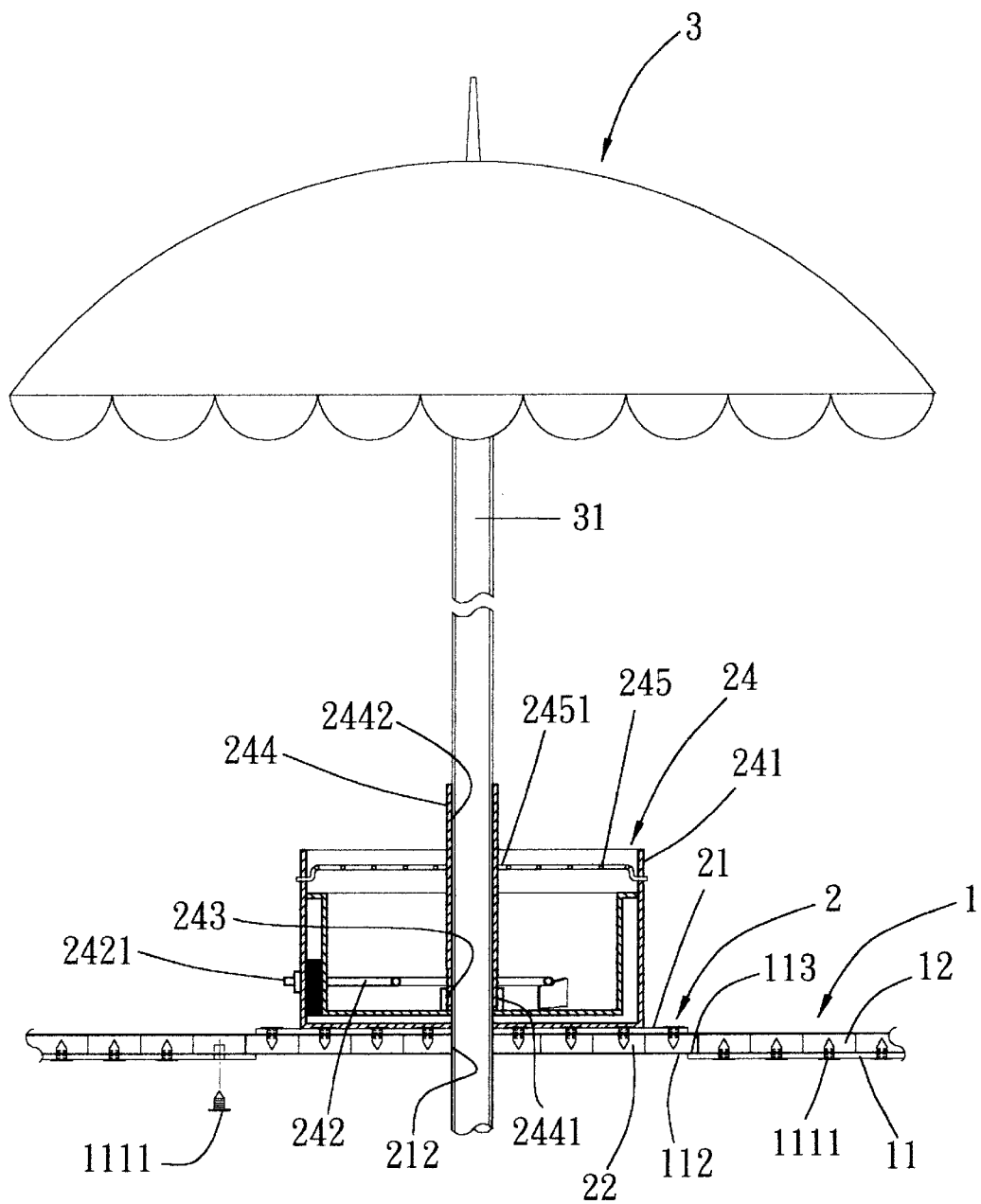
FIG. 4 is a sectional view of a part of the present invention, showing the barbecue grill unit set in the operative position and the parasol fastened to the heat-insulating sleeve.
Figure 5:
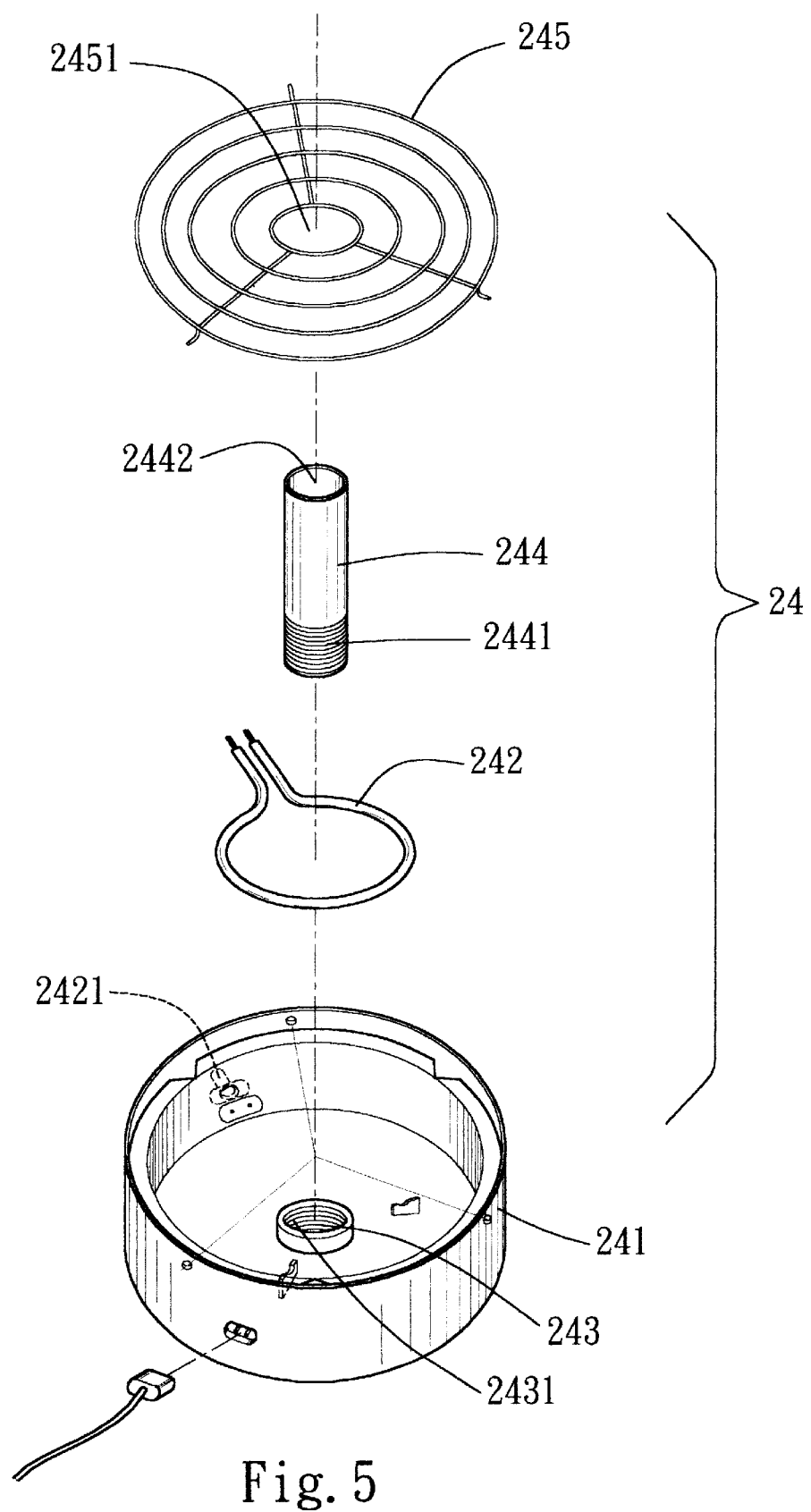
FIG. 5 is an exploded view of the barbecue grill unit according to the present invention.

Referring to FIGS. 1~5, an outdoor table in accordance with the present invention is shown comprising a tabletop 1, and a barbecue grill unit 2. The tabletop 1 comprises a polygonal base plate 11, and face slats 12 fastened to the bottom plate 11 and abutted against one another. The polygonal base plate 11 has a polygonal center opening 112, rows of mounting holes 111 radially arranged around the center opening 112, and a locating flange 113 upwardly protruded from the top side around the center opening 112 and adapted to support the barbecue grill unit 2 in the center opening 112. The face slats 12 are arranged on the top surface of the base plate 11 and abutted against one another in a flush manner, and fastened to the mounting holes 111 of the base plate 11 by screws 1111. One face slat 12 that is disposed adjacent to the locating flange 113 at one side has a transversely extended plughole 121. One face slat 12 that is disposed adjacent to the locating flange 113 at one side opposite to that face slat 12 having such a plughole 121 comprises a transversely extended spring 122 and a steel ball 123 supported on the spring 122 and aimed at the plughole 121.

The barbecue grill unit 2 comprises a polygonal base plate 21 fitting the center opening 112 of the tabletop 1, the base plate 21 having a center hole 212 and rows of mounting holes 211 radially arranged around the center opening 112, a plurality of face slats 22 arranged on the top side of the base plate 21 and abutted against one another in a flush manner and fastened to the mounting holes 211 of the base plate 21 by screws 2111, a cap 23 formed of a cap-shaped split type flap 231 and detachably fitted into the center hole 212, and a barbecue grill 24 fixedly located on the bottom side of the base plate 21. One peripheral face slat 22 has a transversely extended plughole 122 adapted to receive the steel ball 123. One peripheral face slat 12 that is disposed at one side opposite to that face slat 12 having such a plughole 222 comprises a pin 221 adapted to engage the plughole 121 of the tabletop 1. The barbecue grill unit 2 can be put in the center opening 112 and supported on the locating flange 113, keeping the face slats 22 in flush with the face slats 12. Alternatively, the barbecue grill unit 2 can be put in the center opening 112 and supported on the locating flange 113, keeping the barbecue grill 24 at the top for roasting meat, fish, etc. During installation, the barbecue grill unit 2 is obliquely inserted into the opening 112 to force the pin 221 into the plughole 121, and then the barbecue grill unit 2 is set in horizontal in the opening 112, enabling the plughole 222 to be forced into engagement with the steel ball 123. When removing the barbecue grill unit 2 from the tabletop 1, impart an upward pressure to the barbecue grill unit 2 to force the plughole 222 away from the steel ball 123, and then pull the barbecue grill unit 2 out of the opening 112 obliquely.

The barbecue grill 24 comprises a heat-insulating housing 241, the housing 241 having a center through hole 243 and an inner thread 2431 in the center through hole 243, an electric heating coil 242 mounted inside the housing 241, a switch 2421 located on the outside of the housing 241 and adapted to switch on/off the electric heating coil 242 and to adjust the heating temperature of the electric heating coil 242, a cooking grid 245 mounted in the housing 241, and a heat-insulating sleeve 244 fastened to the center through hole 243 and extended out of the center opening 2451 of the cooking grid 245. The heat-insulating sleeve 244 has an outer thread 2441 threaded into the inner thread 2431 in the center through hole 243 of the housing 241, and an axially extended through hole 2442 for the mounting of the shank 31 of a parasol 3.

Figure 6:
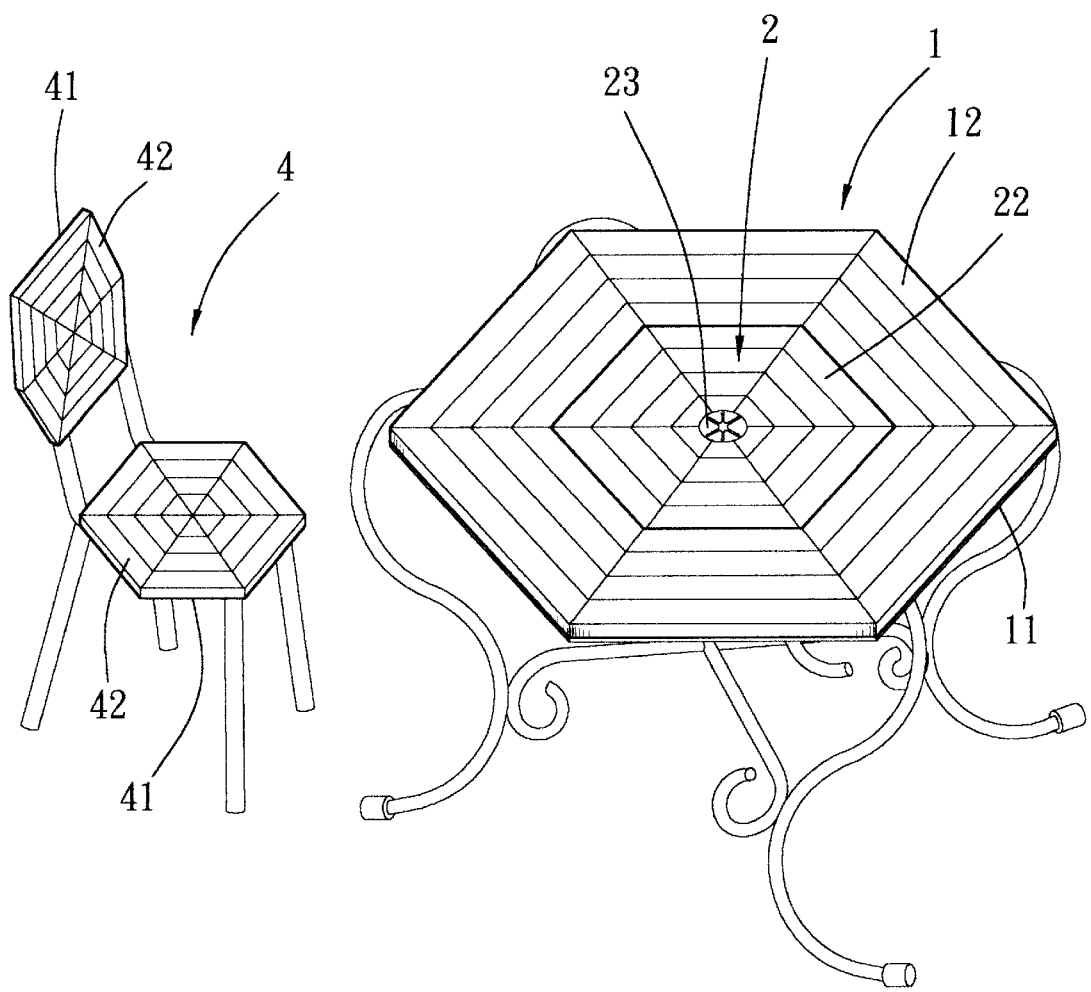
FIG. 6 is an elevational view of the multipurpose outdoor table and a chair.
Figure 7:
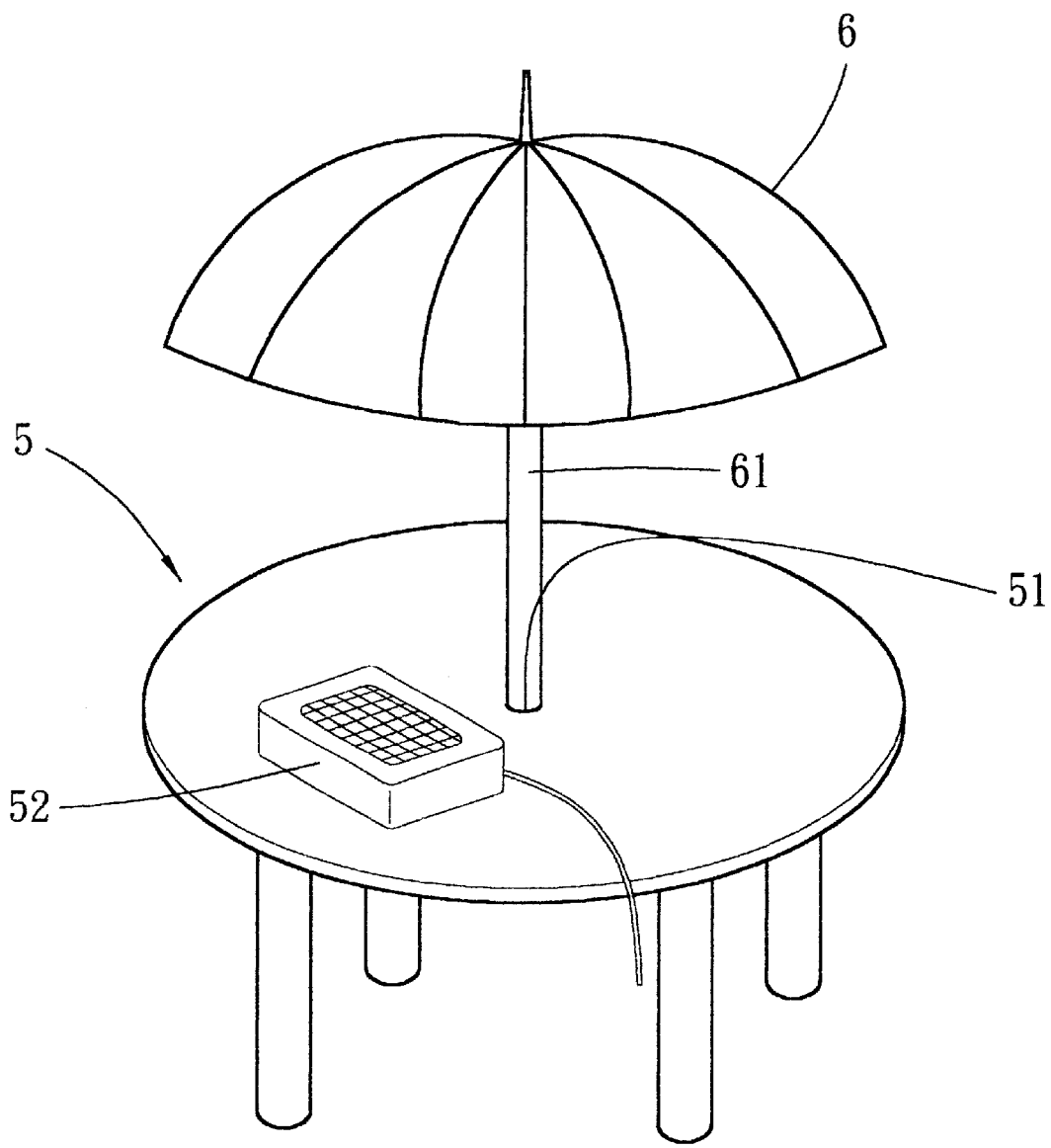
FIG. 7 illustrates the use of a barbecue grill in an outdoor table according to the prior art.

Referring to FIG. 6, the design of the tabletop 1 may be employed to the back and seat of a chair 4. As illustrated, the base or seat of the chair 4 is comprised of a base plate 41 and a plurality of face slats 42 arranged on one side of the base plate 41 and abutted against one another in a flush manner.

A prototype of multipurpose outdoor table has been constructed with the features of the annexed drawings of FIGS. 1~6. The multipurpose outdoor table functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A multipurpose outdoor table comprising:

a tabletop, said tabletop comprising a polygonal base plate, the polygonal base plate of said tabletop having a polygonal center opening, and radial rows of mounting holes, and a plurality of face slats arranged on the polygonal base plate of said tabletop and abutted against one another in a flush manner and affixed to the mounting holes of the polygonal base plate of said tabletop by screws; and a barbecue grill unit selectively mounted in the polygonal center opening of the polygonal base plate of said tabletop between two reversed positions, said barbecue grill unit comprising a polygonal base plate fitting the polygonal center opening of the polygonal base plate of said tabletop, the polygonal base plate of said barbecue grill unit having a first side, a second side, a center through hole through said first side and second side, and radial rows of mounting holes through said first side and said second side, a plurality of face slats arranged on the top side of the polygonal base plate of said barbecue grill unit around the center through hole of the polygonal base plate of said barbecue grill unit and abutted against one another in a flush manner and affixed to the mounting holes of the polygonal base plate of said barbecue grill unit by screws, and a barbecue grill affixed to the second side of the polygonal base plate of said barbecue grill unit.

2. The multipurpose outdoor table as claimed in claim 1, wherein said barbecue grill unit comprises a heat-insulating housing, said heat-insulating housing having a center screw hole through a bottom wall thereof, an electric heating coil mounted inside said housing, a switch located on the outside of said housing and adapted to switch on/off said electric heating coil and to adjust the heating temperature of said electric heating coil, a cooking grid mounted in said housing, said cooking grid having a center opening, and a heat-insulating sleeve fastened to the center through hole of said housing and extended out of the center opening of said cooking grid for the mounting of the shank of a parasol.

3. The multipurpose outdoor table as claimed in claim 1, wherein the polygonal base plate of said tabletop comprises a locating flange extending around said polygonal center opening at a top side and adapted to support said barbecue grill unit in said polygonal center opening.

4. The multipurpose outdoor table as claimed in claim 1, further comprising a positioning structure adapted to secure said barbecue grill unit in said polygonal center opening of said tabletop in position, said positioning structure comprising a first plug hole transversely provided in one face slat of said tabletop adjacent to said polygonal center opening, a pin fixedly provided at one face slat of said barbecue grill unit and adapted to engage said first plughole, a spring supported steel ball provided at one face slat of said tabletop and aimed at said first plughole, and a second plughole provided in one face slat of said barbecue grill unit and adapted to receive said spring supported steel ball.

5. The multipurpose outdoor table as claimed in claim 1 further comprising a split cap capped in the center through hole of the polygonal base plate of said barbecue grill unit.

* * * * *